Sept. 10, 1968　　　　　M. WEIDACHER　　　　3,400,928
SYSTEM FOR CONTROLLING THE STARTS IN RUNNING CONTESTS
Filed Oct. 13, 1964　　　　　　　　　　　　　10 Sheets-Sheet 1
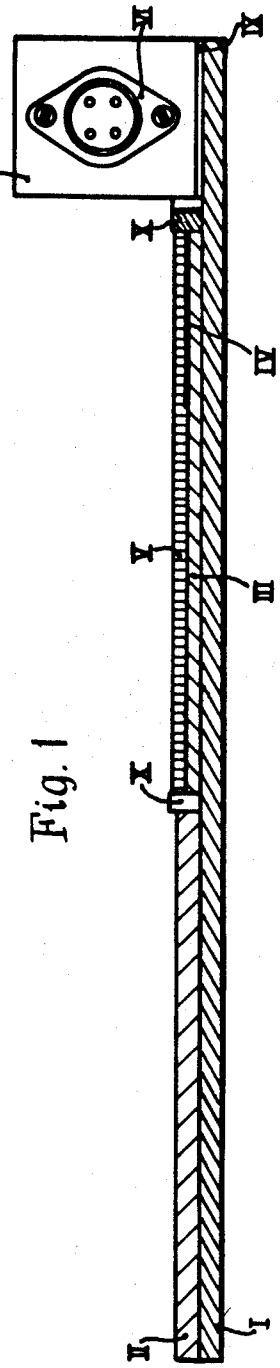
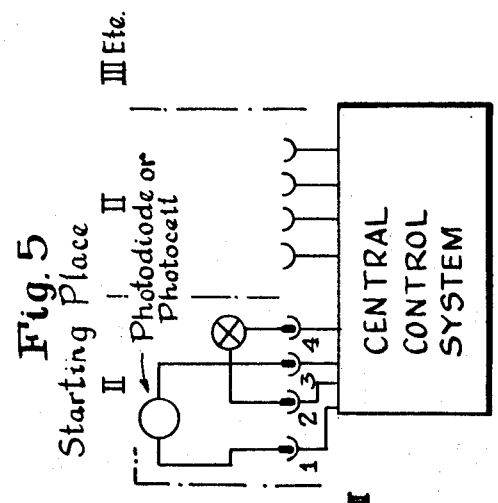
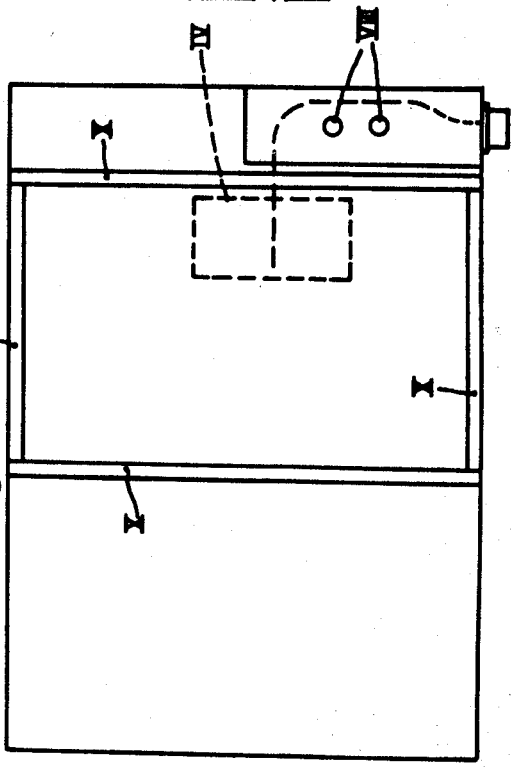

Left part

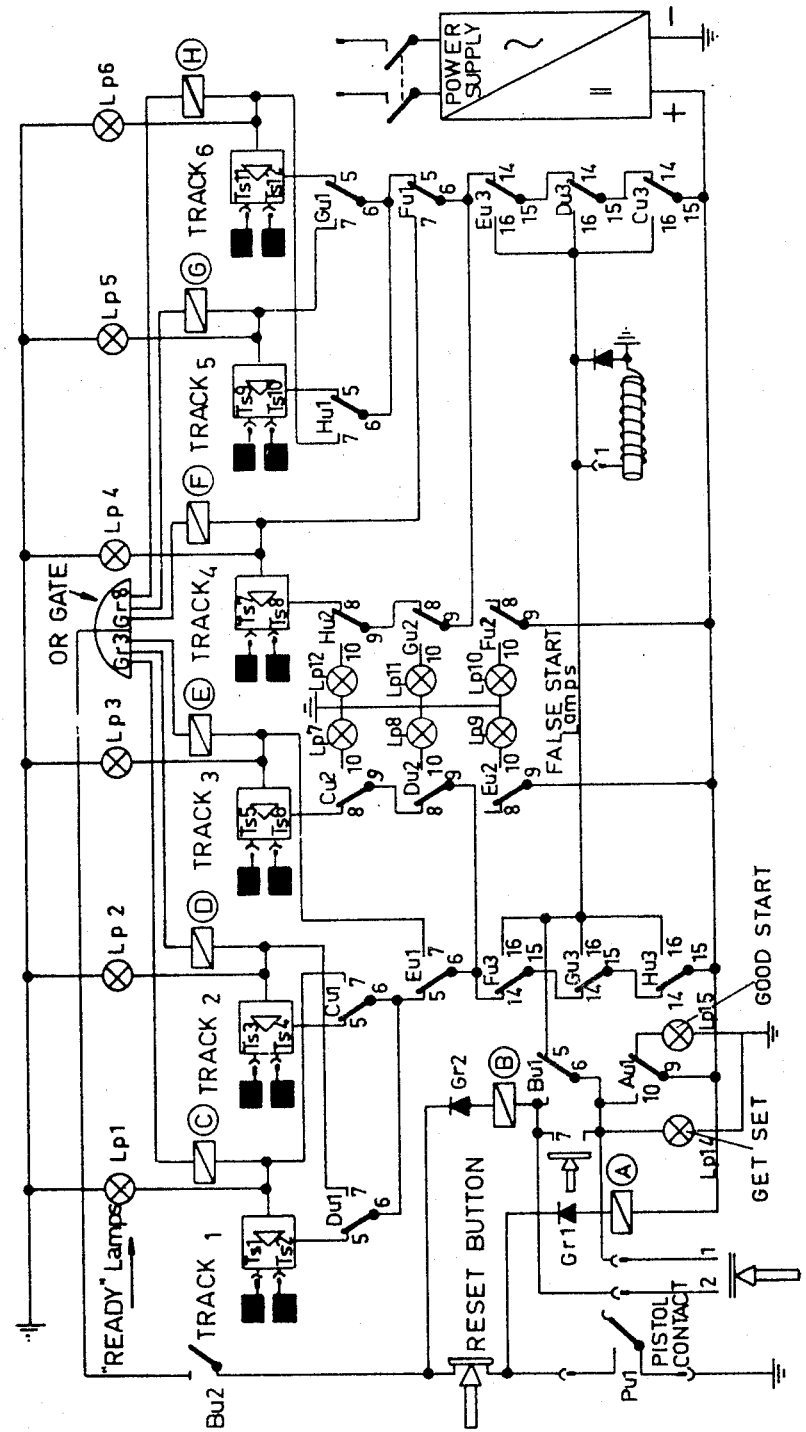

Right part

Left part

Right part

Left part

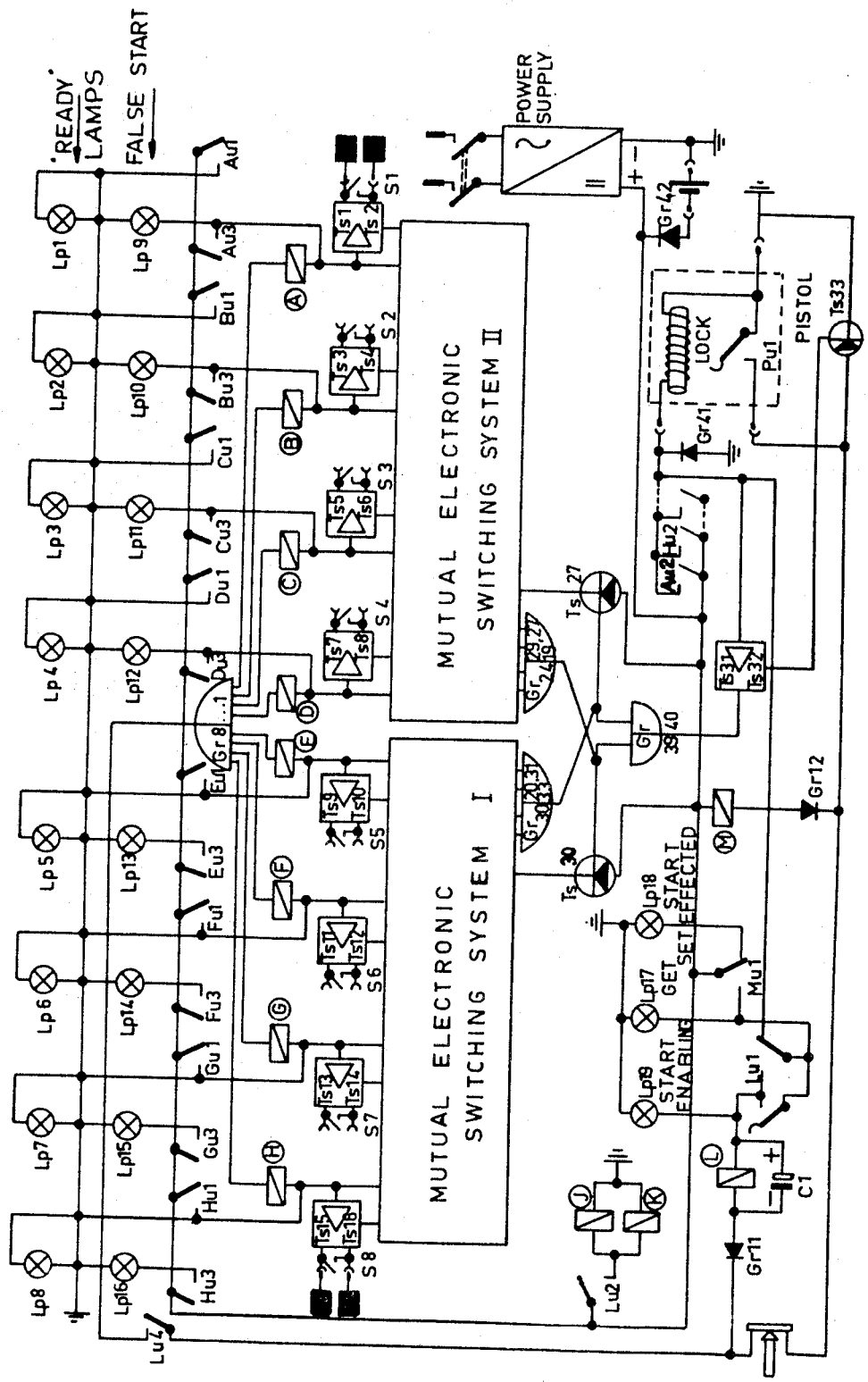

Right part

United States Patent Office 3,400,928
Patented Sept. 10, 1968

3,400,928
SYSTEM FOR CONTROLLING THE STARTS IN RUNNING CONTESTS
Michael Weidacher, Munich, Germany, assignor to Montres Longines Francillon S.A., Saint-Imier, Bern, Switzerland, a firm
Filed Oct. 13, 1964, Ser. No. 403,664
Claims priority, application Germany, Oct. 15, 1963, W 35,430; Oct. 23, 1963, W 35,495
8 Claims. (Cl. 272—59)

My invention has for its object a system for controlling starts in contests, of the type used for instance for light athletic purposes such as running over sprint distances ranging between 100 and 400 m. or hurdle racing and relay racing up to 4 times 400 m. so as to serve as a control of the starts, false starts being ascertained with comparatively simple means allowing an accuracy of 3 milliseconds. In the case of a failure in a start, this may be ascertained in fact with the arrangement according to my invention, in a manner such that only that runner is identified, who has missed his start whereas the other sprinters who have left the starting point after last-mentioned runner and need not be warned, are not recorded at all.

The arrangement according to my invention relates to means signalling the starting in running contests by means of a starting pistol and it is characterized by the fact that the starting pistol is provided with a lock preventing its release which lock may be actuated from a central control station and furthermore, at the starting point of each runner, a starting plate with two electrode connections is provided on the ground which electrodes are bridged in the ready position, by the corresponding runner while the leads for said electrodes are connected with a control station designated in a manner such that it disengages the lock so as to release the starting pistol only when all the starting plates have been bridged and energized by the corresponding runners.

Therefore when a false start occurs, this causes automatically a locking of the starting pistol by means of an electromagnetic lock so that the signalman (starter) is no longer capable of firing the starting shot.

I will now disclose my invention with further detail, reference being made to the accompanying drawings illustrating various embodiments of my invention. In said drawings:

FIGS. 1 and 1A illustrate diagrammatically a starting plate shown in cross-section and in plan view, respectively;

FIGS. 2, 2B and 2a are wiring diagrams of a first embodiment of the complete arrangement according to my invention, being the left-hand side of the diagram, FIGURE 2B, being the right-hand side of the same diagram and FIGURE 2a being a schematic representation of the wiring diagram;

Figure 4:
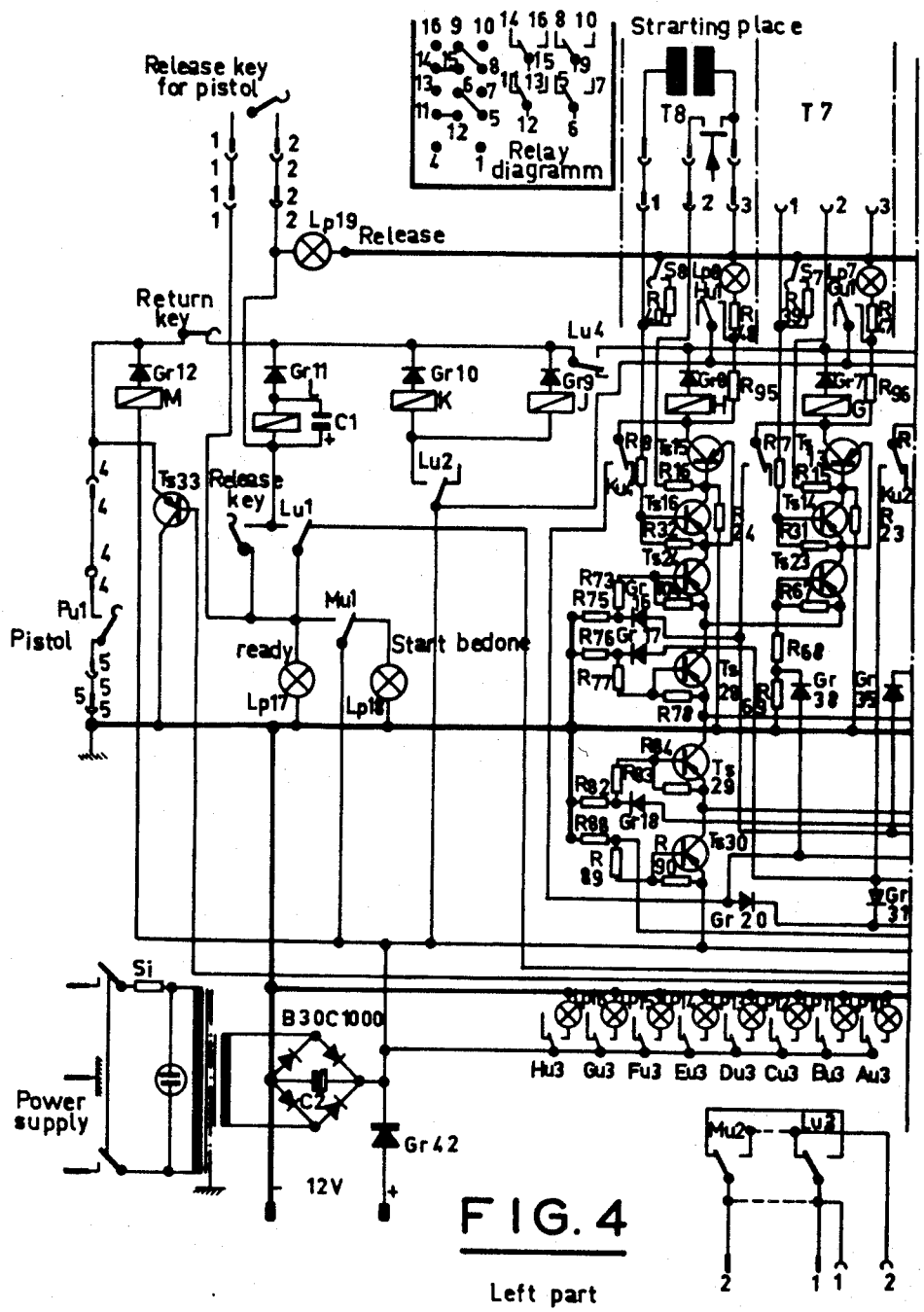
Figure 4B:
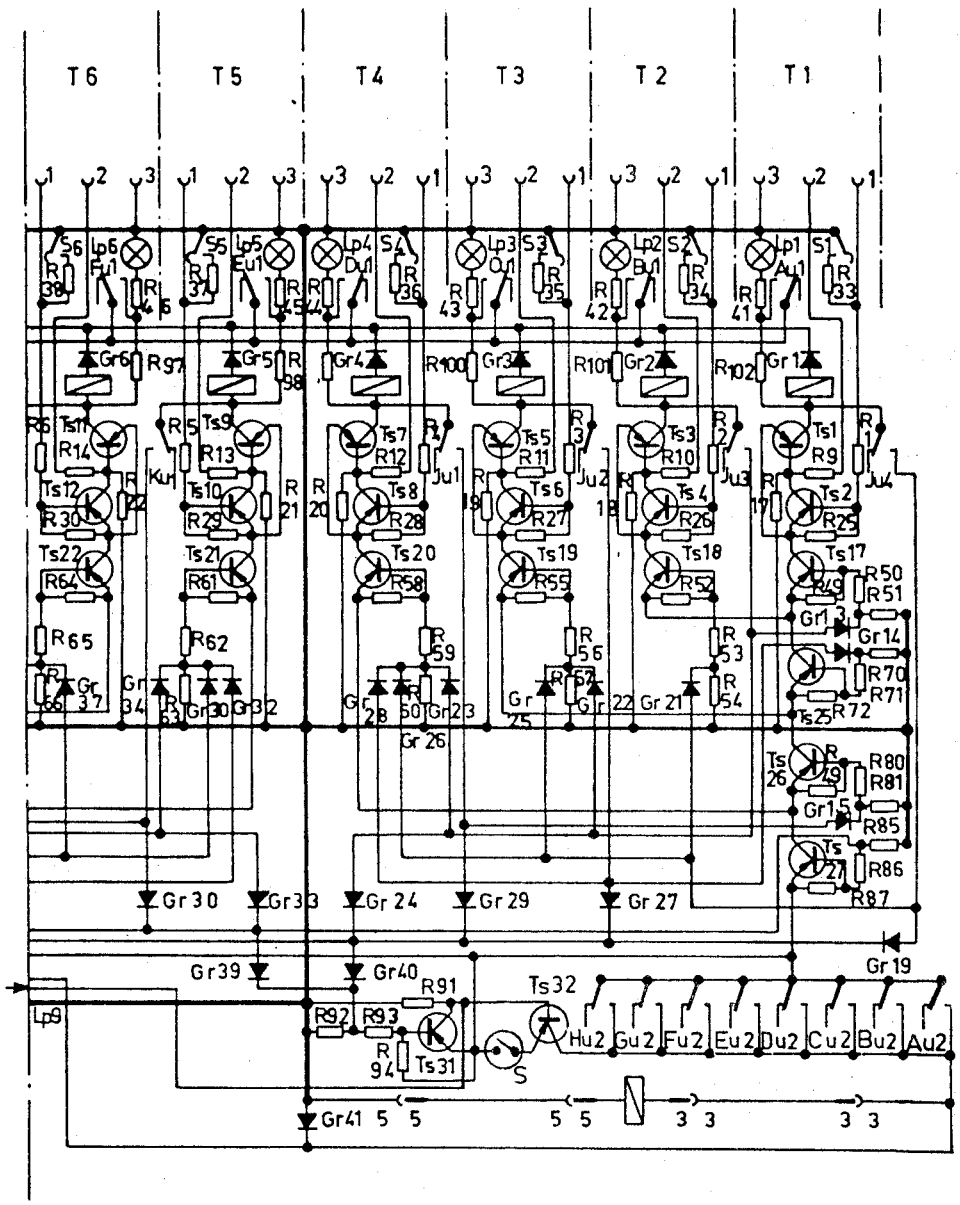

FIGS. 4, 4B and 4a are wiring diagrams of a third embodiment; FIGURE 4B is the right part of the wiring diagram of the claimed system; FIGURE 5 is a wiring diagram of a fourth embodiment of the invention using photodiodes or photocells.

The arrangement includes three sections to wit:
Six starting plates with their indicating means,
A signalling system with six interlocked relays which are controlled by means of transistors,
The starting pistol which is provided with an electromagnetic lock and furthermore actuates simultaneously, upon release of the shot, two miniature switches which deenergize on the one hand the relays of the signalling system and start on the other hand the electric chronometer and the camera photographing the winning post.

The starting plates are constituted by a carrier-plate I of aluminium of a thickness of say 4 mm., the left hand side of which, as apparent from examination of the accompanying drawing, carries a further aluminum plate II of half its size and of a thickness of 4 mm. The latter is electrically connected with the carrier plate. Immediately to the right of the plate II there is provided a plate III made of the material sold under the registered trade name Plexiglas of a thickness of 2 mm., which is glued over the carrier plate I. Over this Plexiglas plate III is glued with the interposition of a copper foil IV a further aluminium plate V of a thickness of 2 mm. which may be secured in an airtight manner for instance by means of a glue such as that sold under the registered trade name Araldite. This plate is thus insulated with reference to the carrier plate. It is also insulated with reference to the aluminium plate II on the left and along its other sides by insulating strips X. Starting from the copper foil IV, an insulating lead connects the latter with a four-poled junction box VI. The small box VII lying at the extreme right furthermore carries a socket with a control lamp VIII for the runner. This lamp is illuminated only when the corresponding runner has failed in his start. The small box VII is provided with a rubber packing so as to be set with the interposition of the latter on the lower plate I. From the unit described, there starts a four-wire cable of which two wires lead to the lamp. The wire 1 starts from the insulated plate, the wires 2 and 4 starting from the carrier plate acting as a grounding mass and leading to the signalling system and the wire 3 leading to the control lamp.

The starting plates may, according to a further development of the invention, be provided with spikes in order to prevent any slipping along the track.

The signalling system is inserted in a Leistner casing measuring 298 x 210 x 155 mm. All the connections for the 6 plates and the starting pistol, the connections with the mains, the safety means, the switches, the indicating and the tell-tale lamps, the keys for releasing and returning to zero and also the six switches which disconnect the starting plates when they are not used or else after a repeated failure in the starting to make said plates inoperative are located on the front side. On the assembling plate, are also fitted the 6 peak relays (C–H) T rls 162b TBv 65421/119e provided each with two switching contact-pieces of which three serve both for the mutual locking and also for indication purposes and for the electromagnetic locking of the starting pistol. The remaining 2 peak relays A and B T rls 162a TBv 65421/119d form, with the releasing and returning key, a unit which prevents the 6 main relays from receiving too early the ground voltage in the case where the starting pistol has already been cocked and one of the sprinters upon becoming ready has broken the circuit at the starting plate, which would lead to an immediate response of one of the six relays.

The four commutating contacts of the six main relays inserted in series as rest contacts serve for the cutting out of an electric chronometer and of a camera for the winning post of the Junghans or Omega type.

The core of the arrangement is a control system constituted by the transistors $Ts1 \ldots 12$ of which the transistors $Ts1$, 3, 5, 7, 9 and 11 (ACY 14) serve as control means while the transistors $Ts2$, 4, 6, 8, 10 and 12 (ADY 12) serve as switch transistors. The principle is comparatively simple. The two transistors operate with an emitter connection and are inserted in series, that is the collector of the transistor $Ts1$ is galvanically connected with the base of the transistor $Ts2$. The collector of $Ts2$ is connected with a peak relay which is bridged in the locking direction by a silicium diode (BAY 12) in order to reduce the voltage peak which appears upon cutting out of the relay by reason of the inductivity of the latter.

The base of the transistor $Ts1$ is connected with the negative potential or voltage only as long as the sprinter bridges with his hand or his fingers the starting plate terminals which are insulated with reference to each other. Thus, a base current may pass which depends on the resistance afforded by the skin. Tests have shown that with a base current of 25 μa. and a voltage of 24 volts, the transistor $Ts1$ is reliably in a condition to control $Ts1$ in the manner disclosed. If a base current flows through the transistor, a collector current will also flow, which depends on the resistance of the collector and on the amplification provided by the transistor. Thus, there is obtained across the preliminary collector resistance, a drop in voltage which is all the larger when the collector current is larger. The voltage between the collector and the emitter decreases consequently. The voltage of the base of the transistor $Ts2$ which is galvanically connected with the collector of $Ts1$ with reference to its emitter is consequently also modified. Since the voltage between base and emitter reaches almost its zero limit, the base current drops also until it reaches almost its zero limit. Thus, there flows now only a negligible collector current of about 25 μa. Across the outer resistance of the collector which is formed by the relay, the voltage drops only to a negligible value which lies far lower than the threshold voltage of energization of the relay. If now the runner takes his hand off the starting plate before the starting shot, which starting shot separates the six different relays with the collectors connected therewith from the negative lead, in such a case, the base current of the transistor $Ts1$ is broken at the same moment. No collector current flows, the base of the $Ts2$ transistor drops in the direction of negative voltages. The voltage between collector and emitter for $Ts2$ collapses and therewith the whole service voltage of the D.C. resistance of the relay drops off. The relay attracts thus at the very moment at which the sprinter ceases touching the starting plate.

The control of the operation of each single unit, is also ensured by an auxiliary signalling lamp (Fg lp 62be) between each collector and the ground at a negative potential so as to indicate permanently whether the starting plates are open or are bridged. The attendant who serves the signalling station is at any time in a position to ascertain whether, upon the order "ready," all the runners have short-circuited their starting plates with their hands. This is given out by the extinction of the six upper signalling lamps having white covering lenses. It is only then that he can depress the releasing key which acts in a manner such that the B relay attracts its armature and maintains its energization through an operative contact while it connects through a second operative contact the six starting relays with the negative voltage. A third contact or inoperative contact which serves for actuation of the magnetic locking of the starting pistol, is now released and the signalman is therefore in a position to shoot. If, however, one of the sprinters releases his hand from his starting plate before the actual shot, the starting relay of the runner who has first opened his circuit becomes operative while the five other sprinters, in case they also take their hands off their starting plates upon seeing the first runner release his plate, are no more recorded, since each relay is provided with a switching contact which, when attracted, disconnects the other relays or transistors with reference to the positive voltage. Each relay is thus ready at the very moment at which it responds, to break the circuit feeding the other relays. The time elapsing between the application of the voltage on the relay and the release of the contact, is equal to only three milliseconds.

The bridging of the peak relays by means of a silicon diode (BAY 12) can also be omitted according to a further development of the invention, since both the signalling lamps $Lp1 \ldots 6$ and the contact-pieces $Cu1 \ldots Hu1$ (contacts 6 engaging 7 upon energization) limit the voltage peaks upon cutting off of the current. The silicon diodes are required however between the relays and the bus bars in order to prevent a mutual influence between the relays since otherwise ground voltage would be applied through the $Lp1 \ldots 6$ lamps and the relays onto the bus bars, before the contact $Bu2$ is closed. The starting pistol is a 6 mm. gas pistol RG 6 built by the Rohm Co. An aluminium casing secured to the left-hand side of the pistol is provided with an electromagnetic lock, two miniature switches, a start-indicating lamp and a six-pole junction box. The electromagnetic lock is constituted by a round relay T rls 6 without any springs. The armature depresses upon attraction of the relay, a bolt between the trigger and the safety ring and it prevents upon cocking of the pistol, any shifting of the trigger sufficient to release the striker.

Through the forward movement of the striker, a steel ball of 8 mm. which can run between the pistol casing and the aluminium trough is pressed by about 2 mm. into the latter. Thus, the miniature switch is actuated. Since both miniature switches are provided with switching contacts, one of them serves as an operative contact for the camera photographing the winning post and the chronometer while the other serves for separating the 8 relays from ground potential in the signalling system.

*Operation*

When the signalling system is connected with the network, the starting pistol is in its uncocked condition, and the six starting plates are connected with the signalling system through the couplings Mak6 or Mak4 (Hirschmann), the signalling lamps $Lp1 \ldots 6$ and the tell-tale lamp $Lp13$ (with a green covering lens Fg lp 68d) are illuminated to indicate the starting. Now sprinters are urged by the "Ready" order to their starting posts. The sprinters must then necessarily touch with their hands the ground behind the starting lines. This circumstance is made use of, since each starting path includes a so-called starting plate which the runner has to engage with his right hand. For his left hand, there is provided a dummy plate which corresponds with the starting plate as to size and thickness. Said dummy plate serves only to bring the hands of the sprinter into registry.

When the six runners have touched the starting plates with their hands, the signalling lamps $Lp1 \ldots 6$ with a white covering lens Fg lp 68a, are extinguished as already described. When the hands of the sprinters are very dry, there is still a possibility of the lamps glowing still very faintly.

The signalman then cocks his pistol whereby the contact $Pu1$ in the pistol is closed. The relay A becomes operative and switches the contact $Au1$ so that the tell-tale lamp $Lp14$ with a yellow covering lens Fg lp 68c is illuminated, shows readiness and indicates to the attendant that the starting system is operative. Furthermore, the contacts $Au1$ and $Bu1$ actuate then the electromagnetic lock so that the signalman cannot fire his pistol.

Upon the order "Ready," the sprinters lay their weight on both hands. The pressure on the starting plate is then increased and reduces the resistance in the circuit. If one of the tell-tale lamps $Lp1 \ldots 6$ was still glowing weakly, it is now reliably extinguished. When the attendant at the signalling station, hears the order "Ready" and is certain that none of the tell-tale lamps $Lp1 \ldots 6$ is illuminated, he depresses the releasing key whereby the electromagnetic lock is deenergized under the control of the switching contact $Bu1$ and simultaneously the relay B becomes self-energized through the contact $Bu1$.

The control or tell-tale lamp $Lp15$ with a green covering lens Fg lp 68d, showing that the starting pistol is released, is now illuminated together with the tell-tale lamp with a green covering lens on the pistol. The switching contact B$u$2 closes and the relays C . . . H are fed with ground voltage. The signalman can now fire the pistol and the movement of the trigger upon shooting open again the contact P$u$1 in the pistol and separates the different relays A . . . H from ground voltage.

The deenergization of the relays A and B causes them to drop. The switching contact A$u$1 is reversed and the lamp L$p$13 showing that the starting has been executed, is illuminated while the "Ready" lamp L$p$14 is extinguished. The contacts B$u$1 and B$u$2 are also reversed and the relay B remains deenergized until the pistol has been cocked again, the relay A has attracted its contact to reverse the contact A$u$1 and the releasing key has been depressed. Also the B$u$2 contact, which is reversed after the shot, insulates the relays C . . . H from ground voltage.

Figure 3:
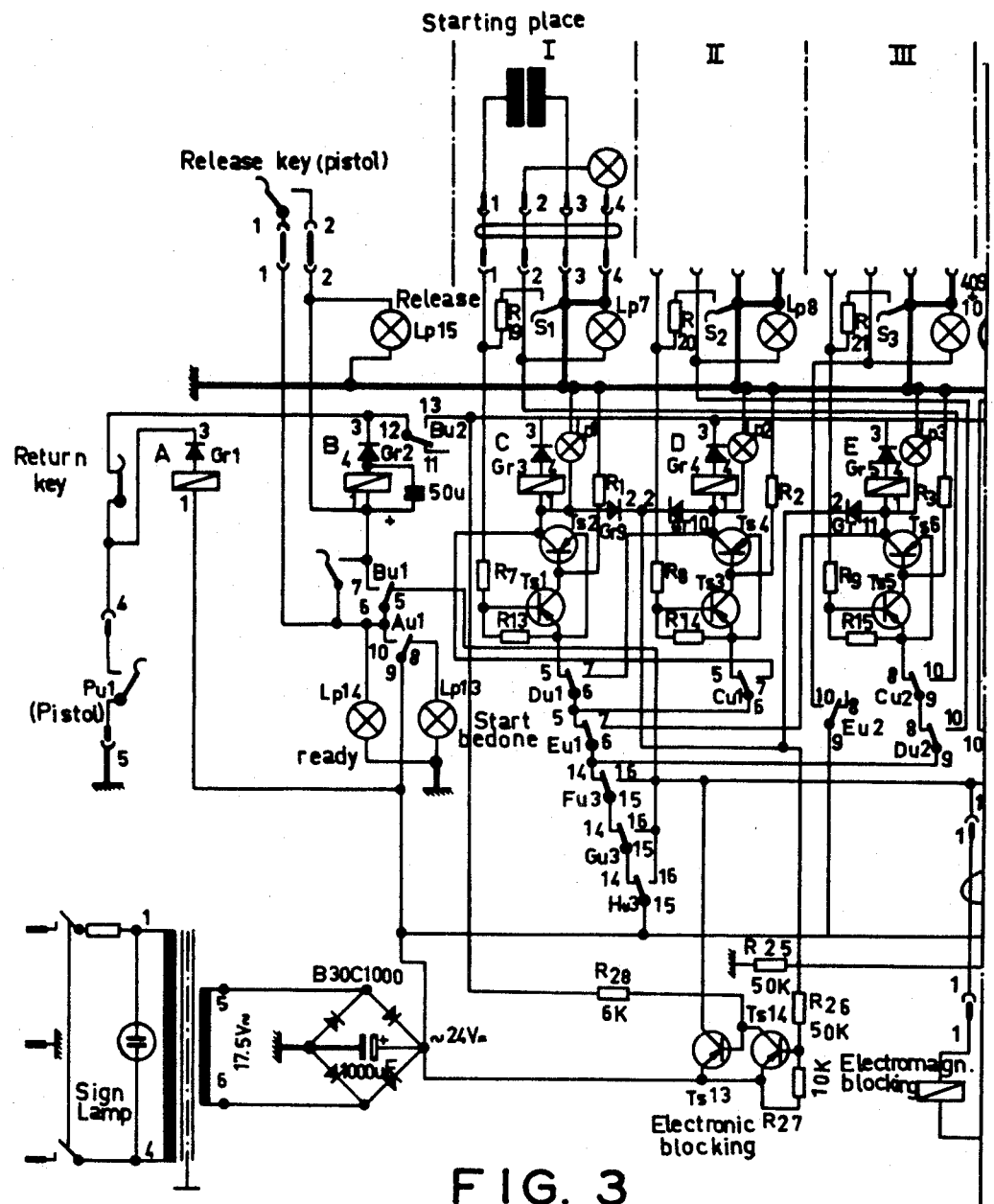
FIGS. 3, 3B and 3a are wiring diagrams of a second embodiment, being the left-hand side of the diagram, FIGURE 3B being the right-hand side and FIGURE 3a being a schematic representation of the same circuit.

However, if before the firing, a sprinter takes his hands off the starting plate, for instance on the running path I associated with the relay C, said relay is immediately operative as shown in FIG. 3. The attraction exerted reverses the contacts C$u$1 . . . C$u$4. Upon reversal of the relay D, C$_1$ is insulated with reference to the positive side of the service voltage while it energizes simultaneously the relay C through its contact C$u$1. The contact C$u$2 insulates the relay E from the service voltage and energizes simultaneously the tell-tale lamp L$p$7 having a red covering lens and indicating the faulty start.

The contact C$u$3 insulates on the one hand the relays F, G and H from the service voltage and it energizes on the other hand the lock so that the pistol is now locked. The contact C$u$4 insulates furthermore the electric chronometer from the pistol. If the faulty start has taken place on any other part such as II . . . VI, corresponding to the relays D . . . H. the procedure is the same as that obtained with the above-described operation of the relay C.

In order to return the central control station after a faulty start into its first condition prior to starting, it is necessary to depress the return keys so as to insulate for a short time the different relays from the negative ground voltage. In such a case, the relay B drops and the contacts B$u$1 and B$u$2 are reversed and remain inoperative since the contact A$\mu$1 has been reversed transiently. It is only upon repeated depression of the releasing key that the relay B is again self-energized through the contact contact B$u$1 and the signalman is in a position to release the starting shot. A further tell-tale lamp L$p$16 is controlled by the chronometer and shows whether the chronometer and the camera for the winning post are ready for the start.

The switches S1 . . . S6 have for their purpose to short-circuit the starting plate over a resistance of 500 kilohms when the starting path is not being used so that the corresponding relay cannot attract its contacts. The arrangement is in a position to record faulty starts within a range of three milliseconds. A so-called back shooting of the sprinters is no longer necessary since the starting pistol is immediately locked upon failure of a start. Therefore, it is no longer necessary to provide a second pistol as formerly.

Chiefly in the case of runs which are to be executed in record times, the arangement serves for ensuring a perfect start. The sprinters are also certain that when the starting shot has been executed, they will not be ordered back by a further shot to their starting positions. The signalman is also released of the considerable responsibility of having to shoot back into the running area, in the case of a doubt as to the accuracy of the start executed.

In the embodiment described, the starting plate is provided with two electrode connections ensuring the galvanic connection or bridging by the hands of the runner. Similarly, this bridging could be provided under one foot or both feet of the runner at the starting point.

Furthermore, instead of a galvanic bridging, it is possible to provide also a capacitory bridging. In this case, it is necessary to use instead of a D.C. connection, a bridge connection. In this case, it is advantageous to feed it with A.C. preferably of a low frequency. Care should merely be taken after removal of the grounded limbs to transform the modification in capacity of the starting plate into a modification in resistance which serves then in its turn for releasing the corresponding switching procedure.

Figure 2:
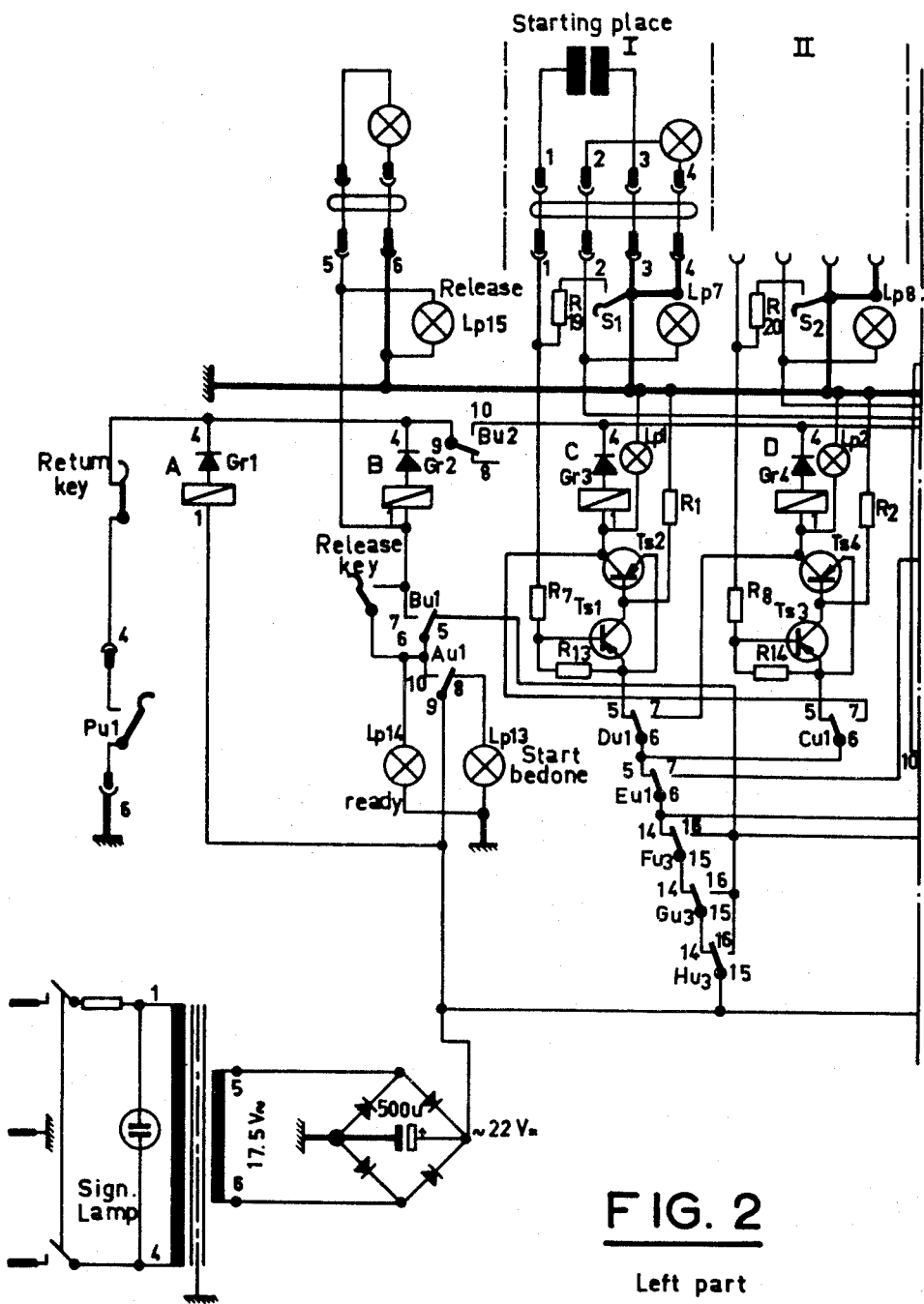
Figure 2B:
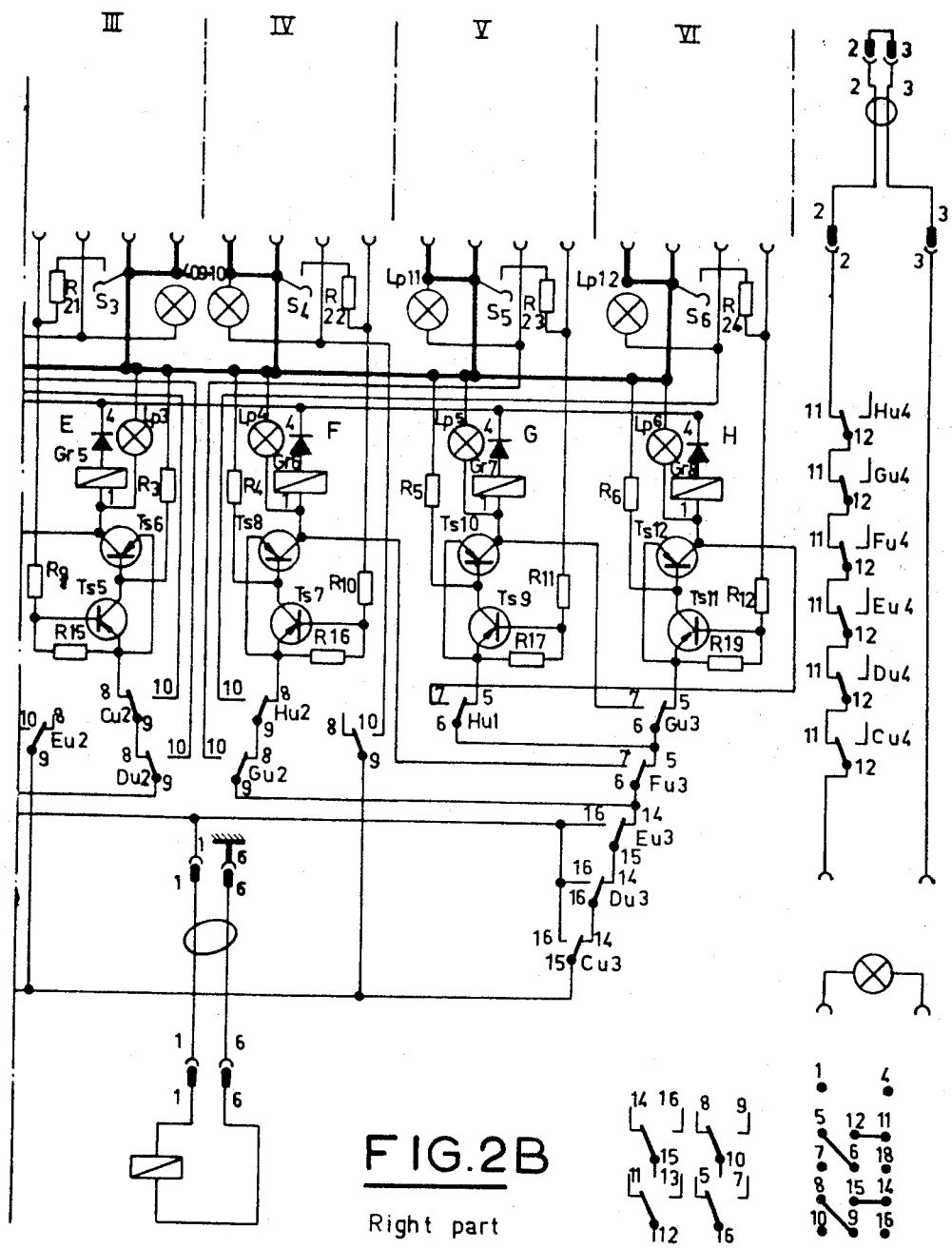

FIGURE 2$a$ shows the circuit diagram of FIGURES 2 and 2B in greater detail. As shown, each track has two starting plates and switching means consisting of amplifiers T$s$1 and T$s$2; and in the output of each is a relay labelled C to H which relays are all interconnected via an OR gate (G$r$3 to G$r$8) to a common energizing circuit leading through three contacts B$u$2, etc., the reset button and through switch PU to the ground. Each relay has a plurality of contacts associated herewith designated by the letter U and the prefix C . . . H indicates to which relay each contact belongs. The function of the contact is indicated elsewhere in the text. There are two sets of lamps: one, the ready lamp L$p$1 to L$p$6; and the other, the false start lamps L$p$7 to L$p$12. Electromagnetic locking means are provided which are energised by the excitation of one of the switching means preventing discharge of the start indicator or pistol, and will be explained later.

Furthermore, and in accordance with a development of the invention, it is possible to supply the starting plate with an element transforming modifications in illumination into electric magnitudes, for instance by means of a photodiode or of a photocell whereby upon release of the starting plate, the surrounding light releases in the element an electric procedure so as to produce at the control station, a corresponding critical signal. This embodiment of the invention is shown in FIGURE 5.

According to a further development of the invention which is illustrated by way of example in FIG. 3, it is possible to accelerate the operation of the electromagnetic lock actuating it, before the response of one of the relays (C . . . H), by means of a further transistor amplification obtained by the transistors T$s$13 and T$s$14, the resistances R20 up to R28 together with the diodes G$r$9 up to G$r$14. Thereby, the switching delays in the relays C . . . H are cut out. The switching is operated as follows: upon actuation of the releasing key, the relay B is constrained to attract and to be self-energized through its contact B$u$1. The contact B$u$2 is reversed and the base of the transistor T$s$13 and the collector of the transistor T$s$14 are connected through R28 with the negative potential. The transistor T$s$14 is thereby inserted in its circuit, since a base current may flow through the resistances R25 and R26. If now a faulty start is executed on one of the paths I . . . VI, one of the transistors T$s$2, 4, 6, 8, 10 or 12 becomes conductive. The collector of the now conductive transistors is fed substantially with the complete positive operative voltage which reaches now, on the other hand, through the diodes G$r$9, 10, 11, 12, 13 or 14 inserted in the conductive direction, the resistances R25 and 26 forming the voltage dividers. The voltage applied across said voltage divider is modified by the positive voltage fed to it in a manner such that the voltage between emitter and base of the transistor T$s$14 drops to an amount such that the latter is locked completely. The increased collector voltage of the transistor T$s$14 makes the transistor T$s$13 now conductive and the electromagnetic lock is energized before the reversal of the relay. FIGURE 3$a$ shows an embodiment similar to that shown in FIGURE 2$a$ except that additionally there are provided a plurality of lines connected to the output of switching means in parallel with the relays. All the lines are connected via OR gate G$r$9 to G$r$14 (FIGURE 3) to an additional amplifier which excites the electromagnetic lock to accelerate its function, as compared with the first embodiment.

According to a further development of the invention, illustrated by way of example in FIG. 4, it has also been proposed to make the whole arrangement independent of the mains and to allow also its operation through a battery. The arrangement illustrated by way of example is fed with D.C. under 12 volts. Similarly the reversing contacts $Cu1$, $Cu2$, $Cu3$, $Du1$, $Du2$, $Eu1$, $Eu3$, $Fu1$, $Fu3$, $Gu1$, $Gu2$, $Gu3$, and also $Hu1$, $Hu2$, $Hu3$, corresponding to the passage of the semielectronic start-controlling system over as much as six tracks which allowed mainly the mutual locking of the relays with reference to one another, are replaced by transistors acting as electronic switches. A completely electronic start-controlling system including up to 8 tracks, operates then in the manner summarized as follows: as in the first embodiment, the releasing key of the relay L replacing the former relay B ensures transient energization of the latter which remains self-energized through its reversing contact $Lu1$ replacing the former $Bu1$. The contact $Lu2$ feeds the relays J and K with their operative voltage and said relays attract the corresponding contacts. Thus the contacts $Ju1 \ldots Ju4$ are closed together with the contacts $Ku1 \ldots Ku4$. These two relays are essential insofar that, under certain circumstances, all the switching transistors $Ts17 \ldots Ts30$ mutually influence one another during the preparation of a start before the starting signal. For instance, they lock one another and thus they can allow ascertaining a faulty starting.

The further operation is similar to that disclosed with reference to FIG. 2. The number of control lamps $Lp1$, $Lp6$, is increased up to 8, to wit $Lp1 \ldots Lp8$. $Lp13$ in FIG. 2 corresponds to $Lp18$ in FIG. 4. The reversing contact $Au1$ in FIG. 2 corresponds to $Mu1$ in FIG. 4. The tell-tale lamp $Lp14$ corresponding to readiness in FIG. 2 is the same as $Lp17$ in FIG. 4 and similarly the lamp $Lp15$ corresponding to the release of the start signal in FIG. 2 is the same as $Lp19$ in FIG. 4. The reversing contact $Bu2$ in FIG. 2 corresponds to $Lu4$ in FIG. 4. The relays A and B of FIG. 2 carry in FIG. 4 the reference letters M and L. The above-described operation is thus the same up to and including operation of the tell-tale lamp $Lp15$ of FIG. 2. When compared with the example illustrated in FIG. 2, there is however a certain difference in the case of FIG. 4; if a sprinter takes his hands off his starting plate before the shot of the signalman, for instance in the case of track I, which corresponds to relay A, in such a case, said relay becomes immediately operative and thus the contacts $Au1 \ldots Au3$ are reversed. The contact $Au1$ provides for self-energization of the relay A. $Au2$ energizes the electromagnetic lock and $Au3$ the telltale lamp $Lp9$ which may carry a red covering lens. Simultaneously, the almost total service voltage which is equal to the drop in voltage across the emitter and collector of the transistors $Ts17$, 25, 26 and 27 reaches through the operative contact $Ju4$ and the diodes $Gr19$, 21, 25, 28 the base resistances forming voltage dividers R88/89, R53/54, R56/57, R59/60 of the switching transistors $Ts30$, $Ts18$, $Ts19$ and $Ts20$. The voltage across the emitter and base of said transistors is now reduced through the application of the positive service voltage to an extent such that said transistors are no longer conductive. Through the citting out of the transistor $Ts30$, the switching transistors $Ts29$ and $Ts21$ receive no longer any service voltage whereby operation of the relays E . . . H is prevented and the switching transistors $Ts18$, $Ts19$ and $Ts20$ become also nonconductive and cut off in their turn, the voltage feeding the transistors $Ts3 \ldots Ts8$ which control the relays B . . . D. Thus, these relays can no longer attract their armatures and only the relay A corresponding to the track I remains self-energized through its contact $Au1$. It is only by returning his hands onto his plate that the runner can prevent a dropping of said relay. This is important since this allows identifying the runner who has started too soon. It is only through actuation of the restarting key that the different relays A . . . L are transiently disconnected with reference to ground. Thus the relays A, J, K and L drop. The relay M remains however energized so as to prevent through the otherwise possible reversal of the contact $Mu2$ and accompanying reversal of the $Lu3$ contact as a consequence of a delay in the dropping of the relay L by reason of the parallel insertion of the condensers $C_1$ (50 . . . 100$\mu$F), an undesired starting of the chronometer system. Through the diodes $Gr40$, the positive service voltage reaches the base resistance R92/93 of the switch transistor $Ts31$ which resistance forms a voltage divider. The base voltage to be found at such a point is modified through the positive voltage fed through a low resistance in a manner such that the emitter-base voltage of the transistor $Ts31$ is reduced to an extent such that it can no longer allow practically any collector current to pass. Thus the collector voltage rises in the transistor $Ts31$, the transistor $Ts32$ becomes conductive and energizes the electromagnetic lock until the contact $Au2$ the attraction period of which lasts during about 6 milliseconds closes and the transistor $Ts32$ is no longer operative.

If a faulty start is executed on any other path such as II–VIII corresponding to the relays B . . . H, the procedure again is the same as that which has just been described for the relay A.

The start controlling system is thus capable of recording the faulty starts of the different sprinters individually before the shot is fired, within a period of a magnitude of 100$\mu$ second and even less.

The switches S1 . . . S8 have for their object when the starting tracks are not in use, to short-circuit the starting plates over a resistance of 200 kilohms so that the corresponding amplifier transistors and relays remain inoperative.

The resistances R41 . . . R48 in series with R95 . . . R102 serve for limiting the input current shocks produced by the resistance of the cold tell-tale lamps $Lp1 \ldots Lp8$. The power diode $Gr42$ prevents any damage to the transistors in the case of an erroneous connection of the battery poles.

The electromagnetic lock is bridged by a cilicium diode $Gr41$ for its locking direction so as to limit the voltage peak produced by the inductivity of the electromagnetic winding of the lock upon release.

According to a still further development of the invention illustrated also by way of example in FIG. 4, the electromagnetic lock for the starting pistol may be cut out.

An auxiliary power transistor $Ts33$ controlled by the transistor $Ts31$ is inserted in parallel with the contact $Pu1$ of the pistol. The fundamental advantage of this arrangement resides in the fact that the operation of the system for instance up to a few hundredths of a second, independently of the selected duration of dropping of the relay L, is obtained after the shot has been executed. Thus, a faulty start is also ascertained as obtained through the so-called rocking movement or coincidence with the shot.

Upon shooting, the contact $Pu1$ incorporated with the pistol opens. Thus, the different relays A . . . M become non conductive. The relay A drops and the contact $Mu1$ is reversed. Consequently the relay L becomes non conductive and drops with a delay by reason of the presence of the condenser in parallel with said relay L. The contact $Lu2$ opens and the relays J and K also drop. The result is that the contacts $Ju1 \ldots Ju4$ and $Ku1 \ldots Ku4$ open and the whole arrangement is deenergized. However, if a sprinter cuts out the bridging of his starting plate before the dropping of the relay L by taking his hands off the plate, in this case, the switching transistor $Ts31$ is locked through one of the diodes $Gr39$ or $Gr40$, which are controlled on the other hand by one of the diodes $Gr20$, 24, 27, 29, 30, 31 or $Gr33$. Through this locking, the power transistor Ts33 becomes conductive and prevents the different relays from being disconnected with reference to ground and becoming non-conductive. Thus, a faulty start, for instance up to a few hundredths of a second after the shot, can be accurately recorded, so that the time required for the sound of the pistol shot to reach the starting place, can be taken into account. Through the further application of foot-controlled contacts on the starting blocks T1 . . . T8, it is also possible, as illustrated by way of example in FIG. 4 as a development of the invention, to record, after the order "Ready" a twitching or rocking movement of the body which would be equivalent to a faulty start. The closing of said contacts feeds through the resistances R9 . . . R16 the transistors Ts1, 3, 5, 7, 9, 11, 13 or 15 for instance with a base current up to ten times larger in a manner such that, in spite of the conductive condition of the control transistors Ts2, 4, 6, 8, 10, 12, 14 or Ts16, the transistors Ts1, 3, 5, 7, 9, 11, 13 or 15 are not locked. This development allows an auxiliary control, but it should not be used everywhere since the sport regulations are not always interpreted in the same manner everywhere.

The control units together with the relays A . . . D, J and M and also the relays E . . . H, K and L with the corresponding transistors and resistances are advantageously executed as printed circuits since these are more convenient and may form easily connected structures and plates.

In order to obtain an idea of the sizes as tested for the embodiment illustrated in FIG. 4, the following values are given hereinunder by way of example.

| | | | |
|---|---|---|---|
| R1 . . . R8, R92, R93 | Layer resistance | 50 kilohms | 0.2 w. |
| R9 . . . R16 | do | 500 kilohms | 0.2 w. |
| R17 . . . R24 | do | 6 kilohms | 0,2 w. |
| R25 . . . R32 | do | 40 kilohms | 0.2 w. |
| R33 . . . R40 | do | 200 kilohms | 0.2 w. |
| R41 . . . R48 | do | 60 ohms | 0.1 w. |
| R49, 52, 55, 58, 61, R64, 67, 72, 74, 78. | do | 400 ohms | 0.2 w. |
| R50, 51, 53, 54, 56, 57, R59, 60, 62, 63, 65, 66, R68, 69, 73, 75, 76, 77, R80, 81. | do | 3 kilohms | 0.2 w. |
| R85, 86, 88, 89 | do | 2 kilohms | 0.2 w. |
| R91 | do | 1, 5 kilohms | 0.2 w. |
| R94 | do | 10 kilohms | 0.2 w. |
| R95 . . . R102 | do | 10 ohms | 0.2 w. |
| Gr1 . . . Gr40 | Germanium diode | OA 5 | |
| Gr41 | Silicon diode | BAY 11 | |
| Gr42 | Silicon power diode | BY 116 | |
| Ts1, 3, 5, 7, 9, 11, 13, Ts15, 17, . . . Ts31. | Pnp transistor | ASY 33- | AC 152. |
| Ts2, 4, 6, 8, 10, 12, 14, 16 | do | ACY 25- | AC 151. |
| Ts32, 33 | do | ADY 19- | TF 78/IV. |
| C1 | Electrolytic condenser | 50 . . . 100 µF | 15 V. |
| C2 | do | 5000 µF | |
| Lp1 . . . Lp19 | Incandescent lamp | 12 v.05 a | |
| A . . . L | Relays | T rls 154 d T Bv 65719/93e T rls 162b T Bv 65719/119e | Relays produced by Siemens & Halske. |
| M | do | T rls 154c T Bv 65421/93d T rls 162a T Bv 65421/119d | |

These data relate to 12-volt operation.

Figure 3A:
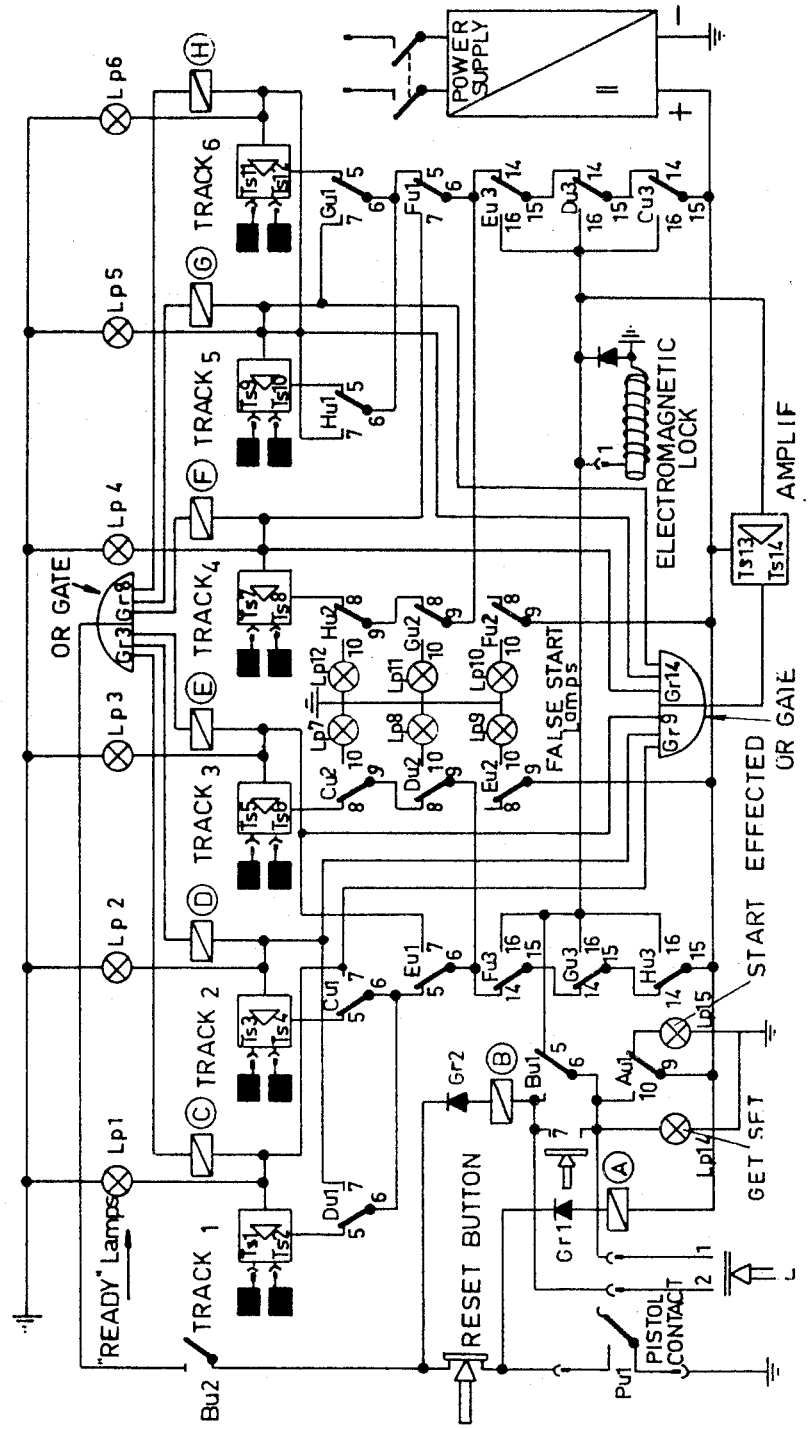
Figure 3B:
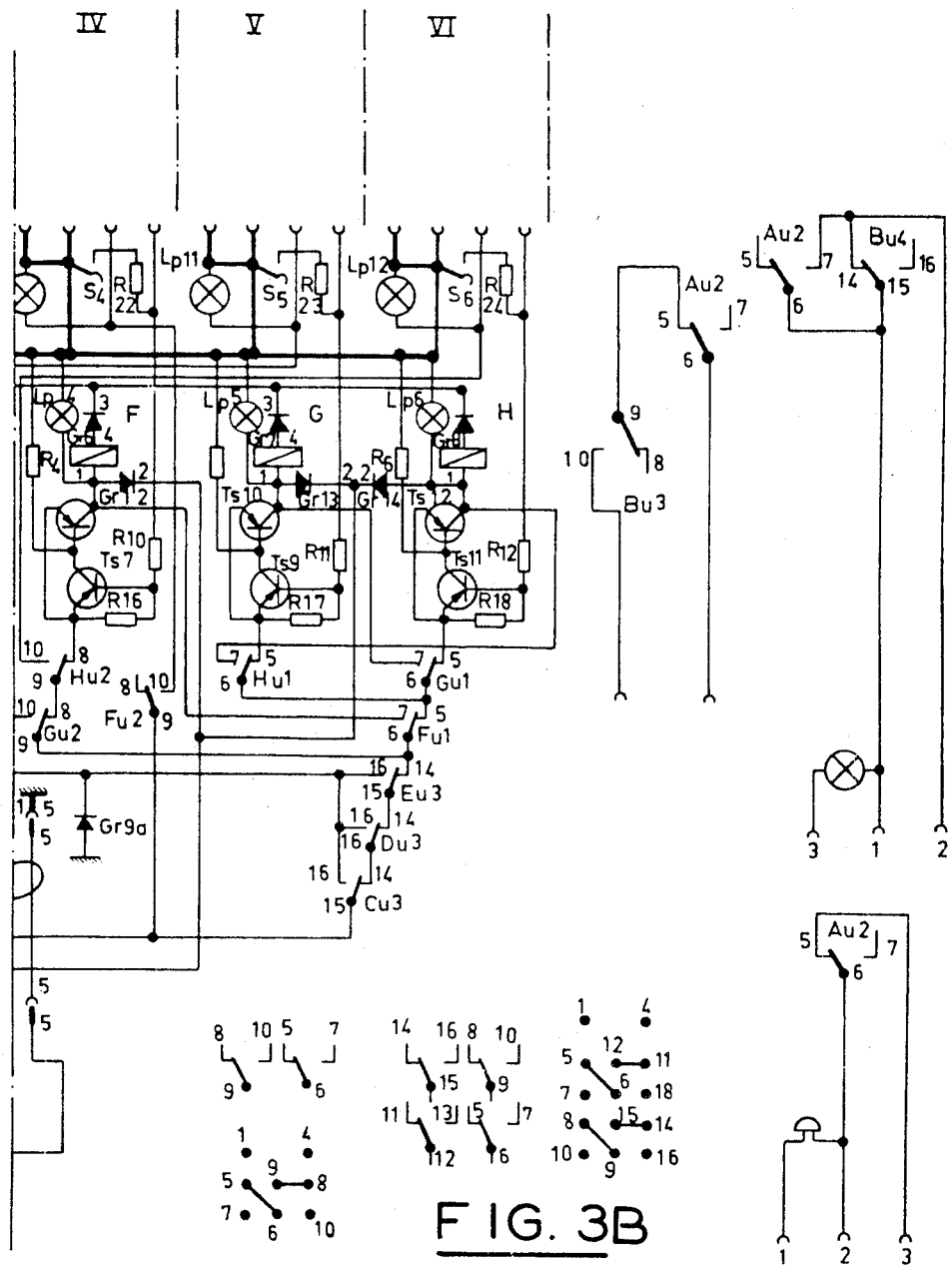

FIGURE 4a facilitates the understanding of the embodiment shown on FIGURE 4, As shown in FIGURE 4a, and in FIGURES 2a and 3a, the starting electrodes are directly connected to switching means Ts1 and Ts2. The arrangement also has ready and false start lamps but instead of having relay contacts serving to disconnect the relays, two mutual electronic switching systems are used which are designated by I and II. All eight tracks are divided into these groups. All the diodes (Gr1 to 8) are included in the OR gate (Gr8 . . . 1). As is well-known, an "OR" gate is a device having several inputs and one output, the output occurring when there is at least one input feeding in. All the outputs of the switching means Ts1, Ts2, etc., lead in the two blocks I, II, which contain, respectively, transistors, Ts21 to 24, 28 29, diodes 32, 34, 36, 35, 37, 16, 17, 18 and contacts Ku1 to 4 and transistors Ts17 to 20, 25 and 26, diodes 23, 26, 28, 25, 21, 13, 14, 15 and contacts Ju1 to 4 (block II). Diodes 20, 30, 31, 33 and 27, 29, 24, 19 are included in the two "OR" gates. Diodes 39 and 40 are included in an OR gate leading to amplifiers 31, 32 which may be connected either to locking means and/or to Ts33.

What I claim is:
1. Race start system comprising a circuit having therein:
    (a) a race-start indicator having electromagnetic locking means;
    (b) at least one starting plate adapted to be laid on the ground at the starting place of each racer, and having two electrodes bridged by the racer when in the ready position;
    (c) each plate having electronic switching means having at least one transistor, an input and an output circuit, said electrodes being in said input circuit, said switching means being in one state when said electrodes are bridged by the racer and in another state when not bridged;
    (d) a plurality of relays, each relay being in the output circuit of said switching means, said relays being in the nonenergized state when said electrodes are bridged, and in the energized state when not bridged each relay being connected to a common energizing source;
    (e) a plurality of contacts for each of said relays, (1) one of said contacts being connected to an energizing source having therein a false start lamp, said lamp being identified with a given starting place; (2) another of said contacts serving as a self-sustaining contact for said relay to maintain the same in the energized state; (3) another contact in the circuit of said locking means;
    (f) means connected to said relays adapted to be actuated, when one of said electronic switching means is energized as a result of the premature cessation of the bridging of the electrodes connected therewith to disconnect all the other relays from said energizing source;
    (g) an auxiliary contact in series with said common energizing source and connected with said race start indicator, said contact being closed before the actuation of said indicator and open when said indicator is actuated thereby disconnecting relays from the energizing source;
    (h) and means including said contact in the circuit of said locking means energizing said locking means to prevent actuation of said indicator if cessation of the bridging of only two electrodes occurs before the indicator is actuated.

2. System according to claim 1, wherein said means (f) consist of the other contacts of said relays, which contacts are mutually interconnected.

3. System according to claim 1, having an additional electronic amplifier, said amplifier having an output and an input, said output energizing said locking means, said input being connected in the output of said switching means and parallel to said relays.

4. System according to claim 1, having an additional electronic amplifier having an input and an output, said output energizing said locking means, said input being connected in the output of said switching means and wherein the said switching means (c) consist of two transistors, one a control transistor and the other a switching transistor and said electro-magnetic locking means (a) are actuated by an amplifier controlled directly by the collector current of said output transistor.

5. System according to claim 1, wherein said means (f) consist of an electronic switching device adapted to be actuated directly by the output of said switching means (c) for interrupting the current from all the other relays from said energizing source.

6. System according to claim 1, having ready lamps connected in the output circuit of the switching means and adapted to receive current when said electrodes are not bridged thereby indicating the bridged condition of said electrodes.

7. System according to claim 1, wherein said relay has a contact for connecting same with a timing or photographic device.

8. Race starting system comprising:
(a) a race start indicator;
(b) at least one starting plate adapted to be laid on the ground at the starting place of each racer, and having two electrodes bridged by the racer when in the ready position;
(c) each plate having electronic switching means having at least one transistor, an input and an output circuit, said electrodes being in the input circuit, said switching means being in one state when said electrodes are bridged and being in another state when not bridged;
(d) a plurality of relays, each relay being in the output circuit of a respective one of said switching means, said relays being in the non-energized state when said electrodes are bridged and in the energized state when these are not bridged, each relay being connected to a common energizing source;
(e) a plurality of contacts for each said relay, (1) one of said contacts being connected to an energizing source having therein a false start lamp, said lamp being identified with a given starting place; (2) another of said contacts serving as a self-sustaining contact to maintain the same in the energized state;
(f) means connected to said relays and adapted to be actuated when one of said switching means is energized as a result of the premature cessation of the bridging of the electrodes connected therewith to disconnect all other relays from said energizing source, said means consisting of: (1) an electronic switching device actuated directly by the output of said switching means for interrupting the current to all other relays from said energizing source and (2) an electronic switch energized whenever receiving an output from one of said switching means;
(g) an auxiliary contact in series with said common energizing source and connected with said indicator, said contact being closed before the actuation of said indicator and open when said indicator is actuated to thereby prevent after a predetermined time delay all relays from being energized by
(h) a by-pass transistor connected in parallel with said auxiliary contact and adapted to be energized by said electronic switch to disable the relay energizing prevention by said auxiliary contact in the event of a cessation of the bridging of the electrodes of any starting plate during said time delay.

References Cited

UNITED STATES PATENTS

| | | | |
|---|---|---|---|
| 621,314 | 3/1899 | Barber | 119—15.5 |
| 1,707,859 | 4/1929 | Johnson | 273—86.6 |
| 2,576,929 | 12/1951 | Ercolino | 200—159 X |
| 2,978,692 | 4/1961 | Riley | 272—59 X |
| 3,169,345 | 2/1965 | Marmo et al. | 46—241 |

ANTON O. OECHSLE, *Primary Examiner.*

A. W. KRAMER, *Assistant Examiner.*